(12) United States Patent
Nieuwoudt et al.

(10) Patent No.: US 9,192,886 B2
(45) Date of Patent: Nov. 24, 2015

(54) CYCLONE, CYCLONE MIST ELIMINATOR AND METHOD OF USE

(71) Applicant: Koch-Glitsch, LP, Wichita, KS (US)

(72) Inventors: Izak Nieuwoudt, Wichita, KS (US); Charles A. Griesel, Bel Aire, KS (US)

(73) Assignee: Koch-Glitsch, LP, Wichita, KS (US)

( * ) Notice: Subject to any disclaimer, the term of this patent is extended or adjusted under 35 U.S.C. 154(b) by 162 days.

(21) Appl. No.: 14/075,685

(22) Filed: Nov. 8, 2013

(65) Prior Publication Data

US 2014/0182454 A1     Jul. 3, 2014

Related U.S. Application Data

(60) Provisional application No. 61/748,330, filed on Jan. 2, 2013.

(51) Int. Cl.
| | |
|---|---|
| B01D 45/00 | (2006.01) |
| B01D 50/00 | (2006.01) |
| B01D 45/12 | (2006.01) |
| B04C 3/06 | (2006.01) |
| B04C 5/04 | (2006.01) |
| B01D 45/16 | (2006.01) |

(52) U.S. Cl.
CPC ............. *B01D 50/002* (2013.01); *B01D 45/12* (2013.01); *B04C 3/06* (2013.01); *B04C 5/04* (2013.01); *B01D 45/16* (2013.01)

(58) Field of Classification Search
CPC ...... B01D 45/16; B01D 50/002; B01D 45/12; B04C 3/06; B04C 5/04

USPC ........ 55/336, 337, 456, 457, 459.1, 447, 418, 55/346, 347, 348; 95/268, 271, 197
See application file for complete search history.

(56) References Cited

U.S. PATENT DOCUMENTS

| 4,818,257 A * | 4/1989 | Kennedy et al. ................ 95/286 |
| 5,320,652 A * | 6/1994 | Akel et al. ...................... 55/320 |
| 7,163,626 B1 | 1/2007 | Cuypers et al. |
| 7,459,001 B2 * | 12/2008 | Christiansen et al. .......... 55/343 |
| 8,025,706 B2 * | 9/2011 | Poorte ............................. 55/346 |
| 8,741,014 B2 * | 6/2014 | Kondo et al. ................... 55/442 |
| 8,858,686 B2 * | 10/2014 | Polderman ...................... 95/219 |
| 2007/0240390 A1 * | 10/2007 | Becker et al. ................... 55/423 |
| 2008/0110140 A1 * | 5/2008 | Egger ............................. 55/337 |
| 2009/0205489 A1 * | 8/2009 | Miemiec .......................... 95/35 |
| 2013/0139689 A1 * | 6/2013 | Schook ........................... 95/271 |

FOREIGN PATENT DOCUMENTS

| RU | 2050980 C1 | 12/1995 |
| RU | 2226421 C1 | 10/2004 |

(Continued)

OTHER PUBLICATIONS

International Search Report and Written Opinion for PCT/US2013/072362 dated Apr. 3, 2014, 7 pages.

*Primary Examiner* — Dung H Bui
(74) *Attorney, Agent, or Firm* — Hovey Williams LLP

(57) ABSTRACT

A cyclone for a cyclone mist eliminator. The cyclone has an inner wall enclosing an inner chamber having an inlet end and an opposed outlet end, an outer wall surrounding and spaced outwardly from the inner wall to create an outer chamber in a spacing between the inner wall and the outer wall, openings foamed in the inner wall to permit fluid in the inner chamber to pass through the openings and into the outer chamber, a swirler positioned at the inlet end of the inner chamber, and a fiber pad positioned in the outer chamber.

16 Claims, 3 Drawing Sheets

(56) References Cited

FOREIGN PATENT DOCUMENTS

| | | | |
|---|---|---|---|
| RU | 2455048 | C1 | 7/2012 |
| SU | 417676 | A1 | 2/1974 |
| SU | 434964 | A1 | 7/1974 |
| WO | 2009004036 | A1 | 1/2009 |

* cited by examiner

CYCLONE, CYCLONE MIST ELIMINATOR AND METHOD OF USE

BACKGROUND OF THE INVENTION

The present invention relates generally to devices for the separation of liquid droplets entrained with gas in a flowing vapor stream and, more particularly, to cyclones, cyclone mist eliminators and methods of using same to separate liquid droplets from the gas in the flowing vapor stream.

Cyclone mist eliminators are used to provide high capacity removal of liquid droplets and mist from a vapor stream to improve process efficiencies, reduce product loss, and prevent equipment damage in various processes. In one conventional type of a cyclone mist eliminator, a number of cyclones are positioned side-by-side within a housing and a number of such housings containing the cyclones are mounted to an underside of a tray deck positioned within a vessel. Each cyclone has an open-ended inner chamber formed by a cylindrical or frusta-conical wall. The vapor stream passes through openings in the floor of the housing and enters the inlet end of the inner chamber. A swirler induces a rotating swirling motion to the vapor stream to cause the liquid droplets and mist to impinge upon and coalesce on the inner surface of the wall. The gas from which the liquid has been removed flows axially out of the outlet end of the inner chamber and passes through the tray deck for subsequent removal from the vessel.

The liquid film that has coalesced on the inner surface of the wall of the cyclones is carried by a small amount of gas through narrow openings in the wall into the open volume of the housing. The liquid then disengages from the gas and collects on the floor of the housing where it enters a drain pipe for delivery to the bottom of the vessel for subsequent removal. The gas that has carried the liquid film into the open volume of the housing is then recycled into the inner chambers of the cyclones.

Improvements in the design of cyclone mist eliminators are desired to provide high separation efficiency across a range of operating pressures while reducing the complexity in the manufacture and assembly of the cyclone mist eliminators.

SUMMARY OF THE INVENTION

In one aspect, the present invention is directed to a cyclone for a cyclone mist eliminator. The cyclone has an inner wall enclosing an inner chamber having an inlet end and an opposed outlet end, an outer wall surrounding and spaced outwardly from the inner wall to create an outer chamber in a spacing between the inner wall and the outer wall, openings formed in the inner wall to permit fluid in the inner chamber to pass through the openings and into the outer chamber, a swirler positioned at the inlet end of the inner chamber, and a fiber pad positioned in the outer chamber. In one embodiment, the inner wall and the outer wall have a frusta-conical configuration and the outlet chamber is open at one end to permit fluid to exit the outlet chamber through the open end.

In another aspect, the invention is directed to a cyclone mist eliminator in which a number of the cyclones described above are directly mounted to a side of a tray deck opposite from the side that receives the fluid stream. The cyclones are not grouped within housings, such as in some conventional designs for cyclone mist eliminators, but are simply mounted on the tray deck with no walls or structures separating the cyclones from each other.

In a further aspect, the invention is directed to a method of removing liquid droplets and mist from gas in a vapor stream using the cyclones and cyclone mist eliminator described above. The method comprises the steps of passing the vapor stream through a swirler in the cyclone to impart a swirling motion to the gas stream as it enters an inner chamber of the cyclone, the swirling motion of the gas stream causing liquid droplets in the vapor stream to be flung against an inner surface of inner walls of said inner chamber; removing at least some of said liquid droplets from the inner surface of the inner walls by passing them with a portion of said gas through slits in said inner walls and into an outer chamber surround the inner chamber; deentraining said liquid droplets from said portion of gas by passing said liquid droplets and said portion of gas through a fiber pad in said outer chamber; and removing another portion of said gas from the inner chamber through an open outlet end of the inner chamber to exit the cyclone.

DETAILED DESCRIPTION

Figure 1:
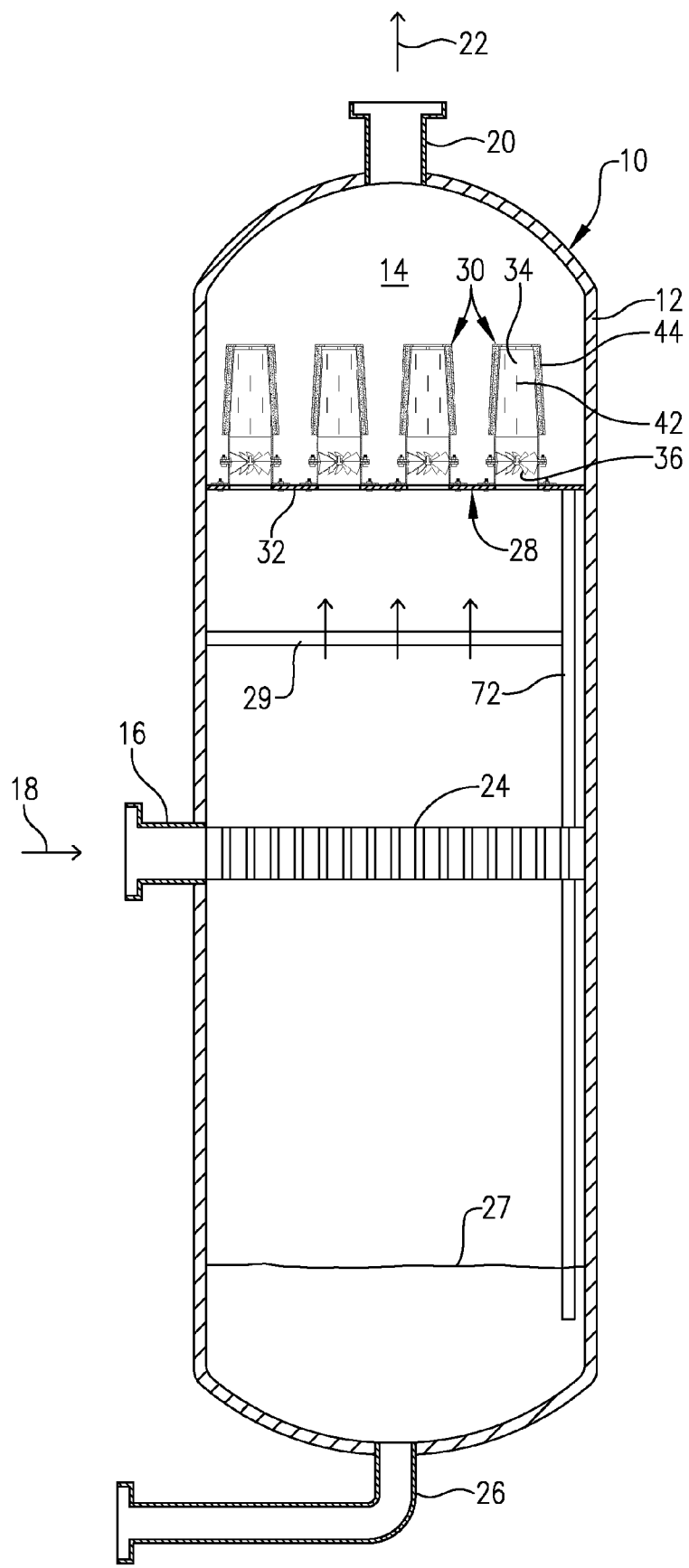
FIG. 1 is a side elevation view of a vessel taken in vertical section to show a cyclone mist eliminator according to one embodiment of the present invention positioned within an open internal region within the vessel.

Turning now to the drawings in greater detail and initially to FIG. 1, a vessel is represented generally by the numeral 10 and comprises an upright cylindrical shell 12 that defines an open interior region 14. The vessel 10 can be a knockout drum, evaporator, steam drum, distillation tower, scrubber or any of various other types of vessels in which removal of liquid droplets from a fluid stream is to occur. An inlet nozzle 16 is positioned at a preselected elevation in the shell 12 for introducing a fluid stream designated by the arrow 18 into the open interior region 14. In one embodiment, the inlet nozzle 16 is a radial nozzle. In another embodiment, the inlet nozzle 16 is a tangentially oriented nozzle.

An upper outlet nozzle 20 is positioned in the shell 12 for removing a processed fluid stream designated by the arrow 22 from the vessel 10. In one embodiment, the outlet nozzle 20 is positioned at generally the same elevation in the shell 12 as the inlet nozzle 16. In the illustrated embodiment, the outlet nozzle 20 is positioned at the top of the shell 12 above the elevation of the inlet nozzle 16. When the outlet nozzle 20 is positioned above the inlet nozzle 16, a vapor distributor 24 may be positioned in the open interior region 14, such as at the elevation of the inlet nozzle 16, to reduce the velocity of the incoming fluid stream 18 and distribute it horizontally across the cross section of the vessel 10. A lower outlet nozzle 26 is provided at the bottom of the shell 12 to draw off liquid 27 that has accumulated in the bottom of the vessel 10.

A cyclone mist eliminator 28 of the present invention comprises a preselected number of individual cyclones 30 that are positioned on a tray deck 32 in the open interior region 14 of the vessel 10. The cyclone mist eliminator 28 is used to remove liquid droplets and mist from the incoming fluid stream 18 before it is discharged as the processed fluid stream 22 through the outlet nozzle 20. A mesh pad 29 may be positioned between the vapor distributor 24 and the cyclone mist eliminator 28 to increase the size of the liquid droplets in the fluid stream 18 so they are more readily removed in the cyclone mist eliminator 28.

Figure 2:
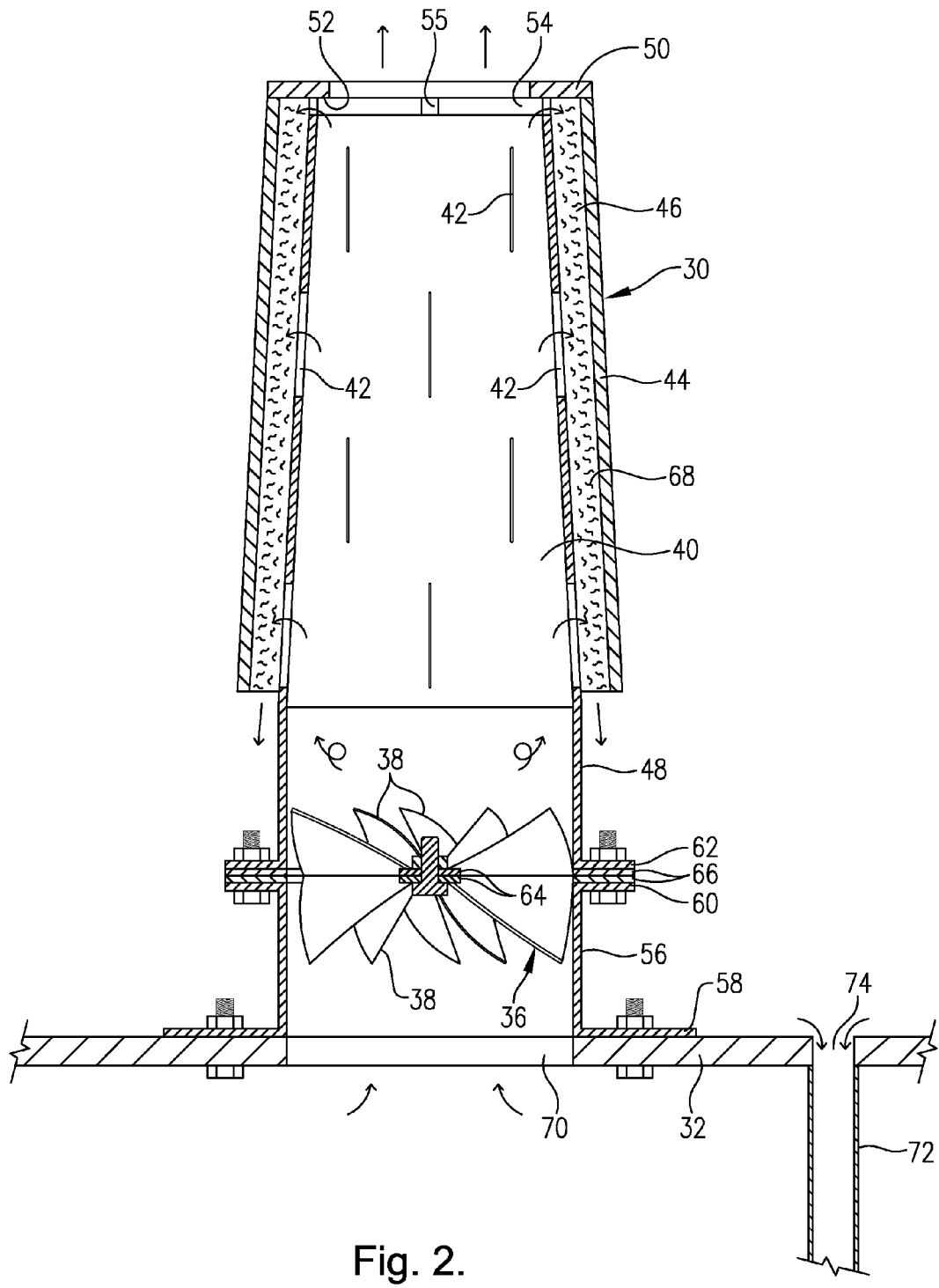
FIG. 2 is an enlarged, side elevation view taken in vertical section of one of the cyclones shown in FIG. 1 mounted on a fragmental portion of a tray deck.
Figure 3:
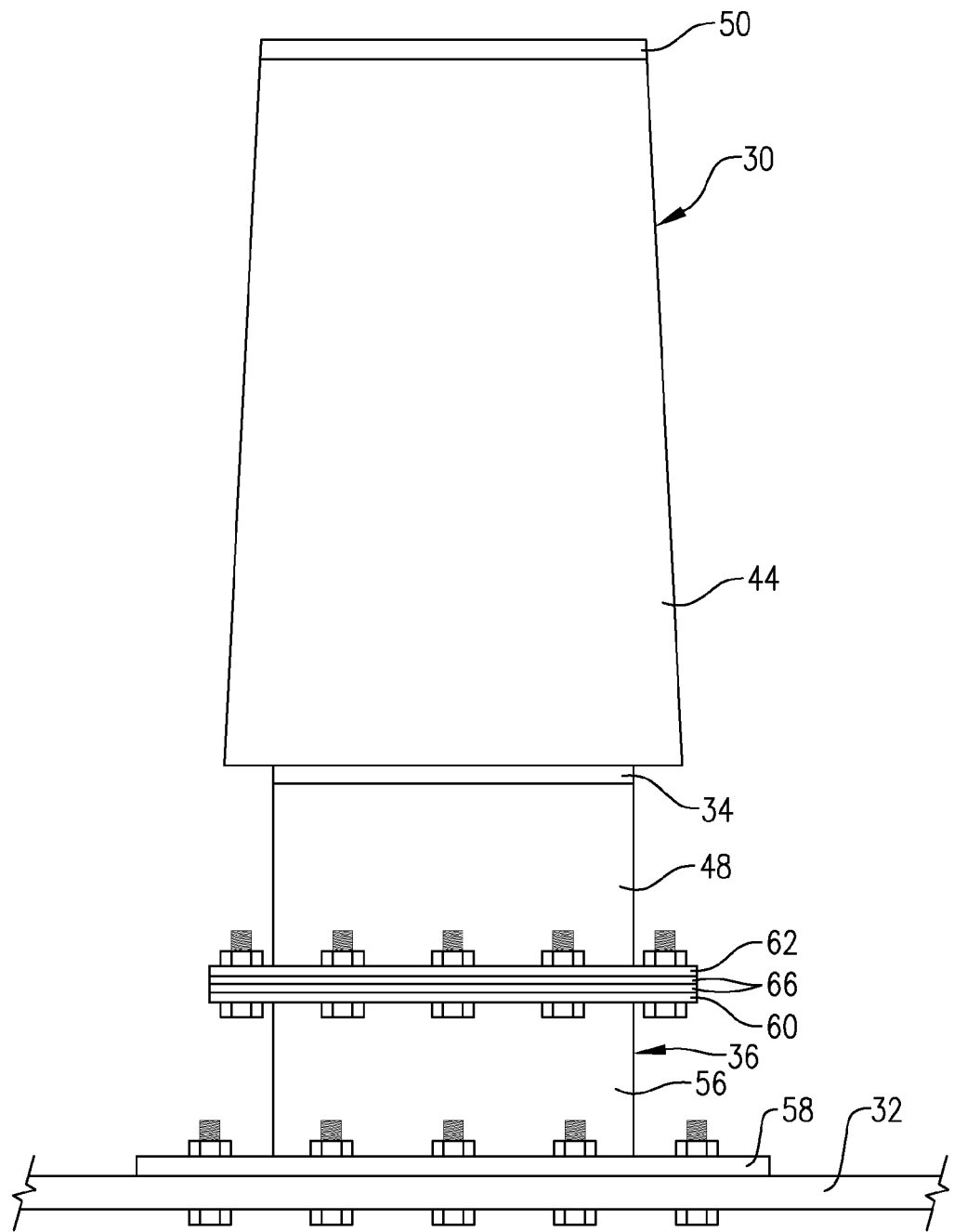
FIG. 3 is a side elevation view of one of the cyclones.

Turning additionally to FIGS. 2 and 3, each cyclone 30 is of substantially the same construction and comprises an inner wall 34 that extends upwardly from a swirler 36 that comprises angled blades 38 that impart a rotational swirl to the fluid stream 18 as it passes through the swirler 36. The inner wall 34 defines an open-ended inner chamber 40 that is open to the axial flow of the portion of the fluid stream 18 after it passes through the swirler 36. The inner wall 34 is generally frusta-conical in configuration in one embodiment and is generally cylindrical in another embodiment. Other configurations are possible and are within the scope of the invention. The inner wall 34 includes a number of openings, which in one embodiment are in the form of axially-elongated, narrow slits 42, which allow the outward passage of fluid through the inner wall 34. Other embodiments of openings may be used in combination with or in place of slits 42.

An outer wall 44 surrounds and is spaced outwardly from the inner wall 34 to create an annular outer chamber 46 in the volume between the outer wall 44 and the inner wall 34. In one embodiment, the outer wall 44 has a frusta-conical configuration that is of complemental shape to the inner wall 34 so that the annular outer chamber 46 is of a uniform width. In another embodiment, the outer wall 44 has a cylindrical configuration that is of complemental shape to the inner wall 34 so that the annular outer chamber 46 is of a uniform width. In other embodiments, the shape of the outer wall 44 need not be complemental to that of the inner wall 34 so that the annular outer chamber 46 varies in width. For example, the annular outer chamber 46 may have a smaller width at the distal end of the cyclone 30 than towards the inlet end of the cyclone 30.

The outer wall 44 may be of the same axial length and is positioned coextensively with the inner wall 34. In the illustrated embodiment, the outer wall 44 is of a shorter axial length than the inner wall 34 and is positioned so that the edges of the outer wall 44 and inner wall 34 at the outlet end of the cyclone 30 are in generally the same plane and an opposite edge of the outer wall 44 is positioned at an intermediate location along the inner wall 34 so that a portion 48 of the inner wall 34 at the inlet end of the inner chamber 40 is not surrounded by the outer wall 44. In one embodiment, the portion 48 of the inner wall 34 that is not surrounded by the outer wall 44 is of a cylindrical rather than frusta-conical configuration.

An inwardly-curved ring 50 is formed or positioned at the distal edge of the outer wall 44 at the outlet end of the cyclone 30 to block or constrict one end of the annular outer chamber 46, while the opposing end of the annular outer chamber 46 remains open. The ring 50 may extend inwardly of the inner wall 34 a preselected distance to form a lip 52. In one embodiment, a gap 54 is formed by spacers 55 between the distal edge of the inner wall 34 and the ring 50 to allow fluid to flow from the inner chamber 40 through the gap 54 and into the annular outer chamber 46. The gap 54 also allows fluid to flow from the annular outer chamber 46 into the inner chamber 40. In another embodiment, the ring 50 is formed as a separate piece from the outer wall 44 and is spaced slightly above the distal edges of both the outer wall 44 and the inner wall 34 to allow fluid to exit the annular outer chamber 46 in the spacing between the distal edge of the outer wall 44 and the ring 50.

Each swirler 36 further includes a cylindrical wall 56 having a diameter that is approximately the same as the cylindrical portion 48 of the inner wall 34 of the associated cyclone 30, a base flange 58 at one end of the cylindrical wall 56 for bolting the swirler 36 to the tray deck 32, and another flange 60 for bolting the swirler 36 to a mating flange 62 at the end of the cylindrical portion 48 of the inner wall 34 of the cyclone 30. In one embodiment, the blades 38 of the swirler 36 are attached at their radially-inner edges to a center hub 64 and at their radially-outer edges to a mounting ring 66 that is sandwiched between and bolted to the flanges 60 and 62. In the illustrated embodiment, two sets of blades 38 and associated center hubs 64 and mounting rings 66 are provided. One set of blades 38 extends within the cylindrical wall 56 of the swirler 36 and the other set of blades extends within the cylindrical portion 48 of the inner wall 34 of the cyclone 30. The angle of attack of the blades 38 within the cylindrical wall 56 can be greater than the angle of attack of the blades 38 within the inner wall 34 to reduce the pressure drop of the fluid stream 18 as it passes through the swirler 36. In another embodiment, the mounting rings 66 of the swirler 36 are simply welded to an inner surface of the cylindrical portion 48 of inner wall 34, thereby avoiding the need for the cylindrical wall 56 and flanges 58 and 60. The flange 62 at the end of the cylindrical portion 48 of the inner wall 34 is then bolted directly to the tray deck 32.

A deentrainment device, which in one form is a fiber pad 68, is positioned in the outer chamber 46 for removing liquid droplets or mist from the fluid stream 18 as it flows through the outer chamber 46. The fiber pad 68 comprises woven or unwoven fibers on which the liquid in the form of droplets or mist coalesces and forms larger liquid droplets that then flow through the fiber pad 68 and exit through the open end of the annular outer chamber 46 before draining onto the tray deck 32. The fiber pad 68 covers the slits 42 and fills a preselected amount of the volume of the outer chamber 46, such as greater than 50% of the volume or all or substantially all of the volume. The density of the fiber pad 68 and the thickness of the individual fibers are selected to provide the desired separation efficiency.

In one embodiment, the fibers used in the fiber pad 68 may be made of a metal, metal alloy, glass, ceramic, carbon, or polymeric material. Examples of metals include titanium, aluminum, and copper. Examples of metal alloys include those based on stainless steel and/or nickel, such as Alloys 100, 300, 400, 600, 800, and the like. Examples of polymeric materials include polypropylene, polyvinylidene fluoride, ethylene-chlorotrifluoroethylene, polytetra-fluoroethylene, polyester fiber or carbon fiber.

The tray deck 32 on which the cyclones 30 are mounted is generally planar and has a series of passages 70 aligned with the inner chamber 40 of the cyclones 30 so the fluid stream 18 is able to flow through the passages 70 and enter the cyclones 30. In one embodiment, the tray deck 32 extends vertically and the cyclones 30 extend horizontally on the surface of the tray deck 32 opposite from the surface that faces the inlet nozzle 16. In the illustrated embodiment, the tray deck 32 is positioned horizontally across the entire cross section of the vessel 10, with the cyclones 30 extending vertically above the upper surface of the tray deck 32. One or more drain pipes 72 extend downwardly from one or more openings 74 in the tray deck 32 to an elevation below the vapor distributor 24.

In a method of the present invention, the fluid stream 18 enters the vessel 10 through the inlet nozzle 16 and is subdivided as it enters the cyclone mist eliminator 28 by passing through the passages 70 in the tray deck 32. The subdivided fluid stream 18 passes through the swirlers 36 in the cyclones 30 and the radially-extending inclined blades 38 impart a swirling motion to the subdivided fluid stream 18 as it passes through the swirlers 36 and enters the inner chambers 40 of the cyclones 30.

The swirling motion causes the liquid droplets or mist in the fluid stream 18 to be flung against the inner surface of the inner walls 34 while the major portion of the gas in the fluid stream 18 flows axially through the inner chambers 40 and exits the cyclones 30 through the open outlet ends of the inner chambers 40. The liquid that has been flung against the inner walls 34 coalesces into a liquid film that moves along the inner walls 34. The liquid film then exits the inner chambers 40 and enters the outer chambers 46 by passing though the slits 42 in the inner walls 34 along with a small or minor portion of the gas in the fluid stream 18. Any of the liquid film that bypasses the slits 42 is captured by the lips 52 at the top of the inner walls 34 and then passes through the gaps 54 into the outer chambers 46 with another small portion of gas from the fluid stream 18.

The liquid and small portions of gas in the outer chamber 46 then move in an opposite axial direction through the fiber pad 68. The liquid is de-entrained from the gas as the liquid droplets impact against the fibers in the fiber pad 68 and coalesces into larger drops that move through the fiber pad 68 and drain through the open end of the outer chamber 46. When the tray deck 32 is horizontally oriented, the de-entrained liquid drains onto the upper surface of the tray deck 32 and enters the drain pipes 72 where it is delivered to a lower portion of the vessel 10 below the vapor distributor 24. When the tray deck 32 is vertically oriented, the de-entrained liquid simply drains to the bottom of the vessel 10. The liquid is then removed from the vessel 10 through the bottom outlet nozzle 26.

The main portion of the fluid stream 18 that has been processed by removal of the liquid droplets or mist from the gas exits through the open ends of the inner chambers 40. The small portions of the gas from the fluid stream 18 that pass through the fiber pads 68 exit through the open end of the outer chambers 46 and rejoin the main portion of the fluid stream 18 prior to exiting the vessel 10 as the processed fluid stream 22 through the upper outlet nozzle 20.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A cyclone for a cyclone mist eliminator, said cyclone comprising:
    an inner wall having a generally frusta-cortical configuration and enclosing an inner chamber having an inlet end that is open to permit a fluid to enter the inner chamber through the inlet opening and an opposed outlet end;
    an outer wall having a generally frusta-conical configuration and surrounding and spaced outwardly from the inner wall to create an outer chamber in a spacing between the inner wall and the outer wall,
    wherein said opposed outlet end of the inner chamber is open to permit a portion of the fluid when present in said inner chamber to pass through said opposed outlet end and out of the cyclone without passing through the outer chamber;
    openings formed in said inner wall to permit another portion of said fluid when present in said inner chamber to pass through the openings and into said outer chamber;
    a swirler positioned at the inlet end of the inner chamber to impart a swirling motion to said fluid when present in said inner chamber; and
    a fiber pad positioned in said outer chamber.

2. The cyclone of claim 1, wherein said fiber pad comprises woven or unwoven fibers.

3. The cyclone of claim 1, wherein said openings in the inner wall are slits.

4. The cyclone of claim 1, including a lip positioned at the outlet end of the inner chamber and extending inwardly into the inner chamber.

5. The cyclone of claim 1, including a ring extending between the outlet end of the inner wall and the outer wall to close one end of the outer chamber.

6. The cyclone of claim 5, wherein an opposite end of the outer chamber is open.

7. The cyclone of claim 1, wherein the outer chamber is open at one end.

8. A cyclone mist eliminator comprising a plurality of cyclones mounted on a surface of a tray deck, each of said cyclones comprising:
    an inner wall having a generally frusta-conical configuration and enclosing an inner chamber having an inlet end that is open to permit a fluid to enter the inner chamber through the inlet opening and an opposed outlet end;
    an outer wall having a generally frusta-conical configuration and surrounding and spaced outwardly from the inner wall to create an outer chamber in a spacing between the inner wall and the outer wall,
    wherein said opposed outlet end of the inner chamber is open to permit a portion of the fluid when present in said inner chamber to pass through said opposed outlet end arid out of the cyclone without passing through the outer chamber;
    openings formed in said inner wall to permit another portion of said fluid when present in said inner chamber to pass through the openings and into said outer chamber;
    a swirler positioned at the inlet end of the inner chamber to impart a swirling motion to said fluid when present in said inner chamber; and
    a fiber pad positioned in said outer chamber.

9. The cyclone of claim 8, wherein said fiber pad comprises woven or unwoven fibers.

10. The cyclone of claim 8, wherein said openings in the inner wall are slits.

11. The cyclone of claim 8, including a lip positioned at the outlet end of the inner chamber and extending inwardly into the inner chamber.

12. The cyclone of claim 8, including a ring extending between the outlet end of the inner wall and the outer wall to close one end of the outer chamber.

13. The cyclone of claim 12, wherein an opposite end of the outer chamber is open.

14. The cyclone of claim 8, wherein the outer chamber is open at one end.

15. A method of separating liquid droplets from a gas in a vapor stream flowing through a cyclone in a cyclone mist eliminator, said method comprising the steps of:
    passing the vapor stream through a swirler in the cyclone to impart a swirling motion to the gas-vapor stream as it enters an inner chamber of the cyclone, the swirling motion of the gas vapor stream causing liquid droplets in the vapor stream to be flung against an inner surface of a generally frusta-conical inner wall of said inner chamber;
    removing at least some of said liquid, droplets from the inner surface of the inner wall by passing them with a portion of said gas through slits in said inner wall and into an outer chamber surrounding the inner chamber;

de-entraining said liquid droplets from said portion of gas by passing said liquid droplets and said portion of gas through a fiber pad in said outer chamber; and removing another portion of said gas from the inner chamber through an open outlet end of the inner chamber to exit the cyclone without passing through said outer chamber.

16. The method of claim 15, including draining the de-entrained liquid droplets from the mesh pad through an open end of the outer chamber to exit the cyclone.

* * * * *